US009263861B2

(12) United States Patent
Schumacher et al.

(10) Patent No.: US 9,263,861 B2
(45) Date of Patent: Feb. 16, 2016

(54) MOUNTING RAIL AND MODULE LATCHING SYSTEM

(75) Inventors: Ralf Schumacher, Lemgo (DE); Klaus Wohlgemuth, Kalletal (DE); Stephan Fehling, Lage (DE); Georg Kulturidi, Detmold (DE); Matthias Niggemann, Lemgo (DE); Klaus Pueschner, Detmold (DE); Marco Waldhoff, Sandebeck (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 468 days.

(21) Appl. No.: 13/812,724

(22) PCT Filed: Aug. 4, 2011

(86) PCT No.: PCT/EP2011/063420
§ 371 (c)(1),
(2), (4) Date: Feb. 22, 2013

(87) PCT Pub. No.: WO2012/022621
PCT Pub. Date: Feb. 23, 2012

(65) Prior Publication Data
US 2013/0216304 A1    Aug. 22, 2013

(30) Foreign Application Priority Data

Aug. 20, 2010   (DE) .................... 20 2010 008 319 U
Aug. 4, 2011    (WO) ................ PCT/EP2011/063420

(51) Int. Cl.
*H02B 1/052*   (2006.01)
*H01R 9/26*    (2006.01)
*H01R 13/633*  (2006.01)
(Continued)

(52) U.S. Cl.
CPC .............. *H02B 1/052* (2013.01); *H01R 9/2608* (2013.01); *H01R 13/633* (2013.01); *H02B 1/041* (2013.01); *H02B 1/0523* (2013.01); *H02B 1/308* (2013.01); *Y10T 403/7075* (2015.01)

(58) Field of Classification Search
CPC ........ H01R 9/26; H01R 9/2608; H02B 1/052; H02B 1/0523
See application file for complete search history.

(56) References Cited

U.S. PATENT DOCUMENTS 5,135,415 A    8/1992  Huber
5,904,592 A *  5/1999  Baran .................... H02B 1/052
                                            361/627

(Continued)

FOREIGN PATENT DOCUMENTS

AT   WO 2004036710 A2 *  4/2004  ............. H02B 1/052
DE        4127253 A1 *  2/1993  ............. H02B 1/052

(Continued)

*Primary Examiner* — Daniel Wiley
(74) *Attorney, Agent, or Firm* — Lawrence E. Laubscher, Sr.; Lawrence E. Laubscher, Jr.; Robert D. Spendlove (57) ABSTRACT

A module latching arrangement for mounting and dismounting on a generally U-shaped support rail at least two module base bodies arranged orthogonally above and extending transversely across the support rail, each of the base bodies having a pair of bottom corner portions arranged on opposite sides of the support rail. At least one foot member is connected for horizontal longitudinal sliding movement relative to one of the base body corner portions relative to the adjacent support rail horizontal flange portion. A lateral displacement arrangement on the foot member is operable, when the foot member is displaced from a locked position toward an unlocked position relative to the support rail, to displace the first base body laterally away from an adjacent second base body mounted on the support rail. The foot member is latched in either a locked or an unlocked position relative to the base member.

14 Claims, 10 Drawing Sheets

(51) Int. Cl.
  *H02B 1/04* (2006.01)
  *H02B 1/30* (2006.01)

(56) References Cited

U.S. PATENT DOCUMENTS

| | | | | |
|---|---|---|---|---|
| 7,674,129 | B1 * | 3/2010 | Liu | H02B 1/052 |
| | | | | 361/807 |
| 2010/0175231 | A1 * | 7/2010 | Lux | H02B 1/052 |
| | | | | 24/593.1 |
| 2010/0255713 | A1 * | 10/2010 | Peng | H02B 1/052 |
| | | | | 439/532 |

FOREIGN PATENT DOCUMENTS

| | | | | |
|---|---|---|---|---|
| DE | 4339785 | A1 | 5/1995 | |
| DE | 29612121 | U1 * | 9/1996 | H02B 1/052 |
| DE | 29916303 | U1 | 3/2001 | |
| DE | 10211903 | A1 | 10/2003 | |
| DE | 10243383 | B3 * | 2/2004 | H02B 1/052 |
| EP | 1648064 | B1 | 12/2012 | |
| FR | 2588438 | A1 | 4/1987 | |
| FR | EP 0437124 | A1 * | 7/1991 | H02B 1/052 |
| FR | EP 1463166 | A1 * | 9/2004 | H02B 1/0523 |
| JP | EP 0373627 | A1 * | 6/1990 | H02B 1/052 |

* cited by examiner

MOUNTING RAIL AND MODULE LATCHING SYSTEM

REFERENCE TO RELATED APPLICATIONS

This application is a national stage application under 35 U.S.C. §371 of PCT International Application No. PCT/EP2011/063420 filed Aug. 4, 2011, claiming priority of German application No. 20 2010 008 319.2 filed Aug. 20, 2010.

BACKGROUND OF THE INVENTION

1. Field of the Invention

A module latching arrangement for mounting and dismounting on a generally U-shaped support rail at least two module base bodies arranged orthogonally above and extending transversely across the support rail, a foot member being connected with a first base body for horizontal longitudinal sliding movement between locked and unlocked positions relative to the adjacent support rail horizontal flange portion. A lateral displacement arrangement on the foot member is operable, when the foot member is displaced from a locked position toward an unlocked position relative to the support rail, to displace the first base body laterally away from an adjacent second base body mounted on the support rail.

2. Description of Related Art

For wiring electrical subassemblies, for example, electrical conductors and/or bus systems and/or modules of complex electronic equipment, one frequently provides panel boxes and switch cabinets in which one can align the electrical subassemblies next to each other on a mounting rail. Such electrical subassemblies, for example, are so-called connection modules or blocks that are used not only in production engineering but also for the interfacing of complex networks. By virtue of this modular alignment, the connection modules can be rearranged in many different ways despite their complexity even after installation with a comparatively minor effort and individual electrical subassemblies are exchangeable.

In such especially standardized panel boxes and switch cabinets, it is also necessary to displace the electrical subassemblies so that they will directly rest against each other.

In this connection, the electrical subassemblies should, on the one hand, be separable from each other as easily and as quickly as possible. On the other hand, they should not by themselves separate from each other, especially in a vibration-stressed environment such as it is often found, for example, in the field of production engineering.

The German patent No. DE 299 16 303 U1 discloses a connection module where the electrical subassemblies that are lined up parallel with respect to each other on the mounting rail can be separated from each other in that their mutual parallelism is canceled out. But it takes a lot of structural space to push these units apart from each other so that there must be a longer part of the mounting rail for the mutual separation of the electrical subassemblies, which means that no additional electrical subassemblies can be mounted there.

Furthermore, it is possibly advantageous in the mutually adjoining walls of mutually adjoining electrical subassemblies in each case to provide electrical contacts that contact with each other when the electrical subassemblies are arranged mutually resting against each other. The cancellation of parallelism and therefore an oblique separation of mutually adjoining electrical subassemblies from each other, however, depending on the particular model of the electrical contacts provided in mutually adjoining walls, for example, in the case of electrical contacts that are made in the form of plug and socket systems, is no longer readily possible. This is because, depending on the structural shape of the contacts, there is the danger that the electrical contacts might be jammed against each other, causing short-circuits, or that the electrical contacts in the process might be damaged or even destroyed.

The present invention was developed to create a subassembly, in particular, an electrical subassembly that can be mutually lined up on a mounting rail which, in a simple manner, quickly, without damage and using as little structural space as possible, can be separated from an adjoining subassembly even if on mutually adjoining side walls there are provided lined-up adjoining subassemblies, in particular, electrical contacts, whereby the subassembly facilitates a secure line-up, in particular, in vibration-stressed environments, so that there will be no danger of a self-actuated mutual separation of several lined-up subassemblies, and whereby the subassembly can be made at reasonable cost.

SUMMARY OF THE INVENTION

Accordingly, a primary object of the present invention is to provide a module latching arrangement for mounting and dismounting on a generally U-shaped support rail at least two module base bodies arranged orthogonally above and extending transversely across the support rail, a foot member being connected with a first base body for horizontal longitudinal sliding movement between locked and unlocked positions relative to the adjacent support rail horizontal flange portion. A lateral displacement arrangement on the foot member is operable, when the foot member is displaced from a locked position toward an unlocked position relative to the support rail, to displace the first base body laterally away from an adjacent second base body mounted on the support rail.

According to another object of the invention, first latching means are provided for latching the foot member in an unlocked condition. Unlatchting means serve to release the foot member for displacement to a locked condition when the associated base member is positioned adjacent a second base member.

A further object of the invention is to provide second latching means for latching the foot member in a locked condition relative to the mounting rail.

Another object is to provide an electrical subassembly which can be attached upon a mounting rail and which, by shifting in a given assembly direction along said mounting rail, can be positioned against an adjoining subassembly that is arranged on the mounting rail. A base member of a first subassembly is provided with a foot member that can be shifted in a shifting direction with relation to the base body, whereby the first subassembly can be separated from the adjoining subassembly by shifting the foot part in the shifting direction, whereby it is pushed away from the adjoining subassembly during the separation simultaneously, and in the direction opposite from the assembly direction.

Upon the separation of the subassembly from the adjoining subassembly, the latter therefore according to the invention is shoved away from the adjoining subassembly so that the subassembly is spaced apart from the adjoining subassembly. As a result, the operator can handle the subassembly in a very simple manner. Besides, the subassembly is pushed away from the adjoining subassembly in a defined manner so that parts, for example, electrical contacts that are arranged on mutually opposite side walls of the subassembly and adjoining subassembly, will not be damaged during the separation of the subassembly.

In order to shift the subassembly from the adjoining subassembly during separation, there is provided on the foot part preferably a shifting means, and on the base body, there is provided a ramp, whereby the shifting means during the separation of the subassembly from the adjoining subassembly slides along the ramp and pushes the subassembly against the assembly direction.

Likewise in a preferred manner, there is provided on the foot part a latching means that so cooperates with a counter-latching means arranged on the base body that the foot part, during the separation of the subassembly from the adjoining subassembly, will latch into an open position on the base body. In the open position, the subassembly is at least not latched upon the adjoining subassembly. Preferably, it is latched neither on the adjoining subassembly nor on the mounting rail so that it can be taken out of the arrangement.

In a preferred embodiment, the subassembly comprises a base body as well as a foot body, whereby by shifting the foot part, it can be arranged in a shifting direction with relation to the base body, both on the adjoining subassembly and also on the mounting rail. For the arrangement of the subassembly, both on the mounting rail and on the adjoining subassembly, one therefore merely needs a part, in other words, the foot part, so that the operator will find it as a result very simple to handle the subassembly during arrangement.

The mounting rail preferably extends parallel to a mounting rail plane whereby the adjoining subassembly, by shifting in a latch-on direction and/or by swinging into a latch-on pivotal direction, both of which in each case run parallel to the subassembly plane, can arranged upon the mounting rail and by shifting along a line-up direction, which runs parallel to the mounting rail plane, can be arranged against the adjoining subassembly.

Accordingly, the subassembly can be arranged on a mounting rail by shifting into a latch-on direction and/or swinging into a latch-on rotary direction, both of which in each case run parallel to a subassembly plane. In the process, the subassembly plane is the plane in which extends a subassembly arranged on the mounting rail. Subsequently, the subassembly can be arranged upon an adjoining subassembly in that it is pushed into an alignment direction that runs parallel to a mounting rail plane in which extends the mounting rail. As a result, for arranging a subassembly between two adjoining subassembly groups and for the separation and removal of the subassembly, one merely needs a structural space that is only slightly larger than the depth of the subassembly itself. Compared to a connection block with a traditional subassembly in the case of this particular connection block with inventive subassemblies, one therefore has available considerably more structural space along the mounting rail and/or such a connection block can be built correspondingly smaller.

Besides, the arrangement of the subassembly upon the adjoining subassembly in case of roughly mutually parallel arrangement will facilitate the supply of parts in mutually adjoining, especially mutually adjoining side walls of the subassembly and the adjoining subassembly. As a result, parts arranged on one of these side walls, which are elevated, in particular, with respect to the side walls upon which they are arranged during the arrangement of the subassembly against the adjoining subassembly are stuck into adjoining parts of the adjoining side wall without being damaged or without causing any damages. The inventive subassembly therefore facilitates the arrangement of, for example, electrical connections, such as plug-and-socket connections in the conventional model upon the side walls of the subassembly.

In a preferred embodiment, the subassembly, during line-up upon the adjoining subassembly, is latched upon the latter so that it will not by itself become separated from the adjoining subassembly in a vibration-stressed environment.

Preferably, the mounting rail plane runs at a right angle to the subassembly plane. Furthermore, it is preferred that a cutting line of the subassembly plane cutting the mounting rail plane should run at a right angle to a longitudinal extent of the mounting rail.

In a preferred embodiment, the subassembly has a subassembly latch means that is provided for latching the subassembly upon the adjoining subassembly, whereby the adjoining subassembly comprises an adjoining subassembly latch means that cooperates with the subassembly latch means during the latching action, whereby the subassembly latch means for the purpose of arranging the subassembly upon the adjoining subassembly can be shifted in the direction of shifting against the force of a power means and which, for the latching of the subassembly upon the adjoining subassembly, is provided in such a manner that it can be pushed back against the shifting direction in the direction of the force.

In this embodiment, the subassembly latch means, therefore during the arrangement of the subassembly against the adjoining subassembly, avoids the adjoining subassembly latch means so that the subassembly can be arranged upon the adjoining subassembly without any rotation or swinging in that it is shoved in the alignment direction preferably in a parallel arrangement with respect to the adjoining subassembly. The subassembly is retained upon the adjoining subassembly with the force of the power means because the subassembly latch means, due to the force against which it is pushed during the arrangement on the adjoining subassembly, is shoved back against the shifting direction.

As power means, one preferably use a compression spring. Therefore, one can also use other, for example, resilient parts, which cause a resetting force.

In a preferred embodiment, the subassembly furthermore has a mounting rail latch means that is provided for the purpose of latching the subassembly upon the mounting rail, whereby the mounting rail has an edge that, during the latching action, cooperates with the mounting rail latch means so that the mounting rail latch means can be pushed against the force of the power means for the arrangement of the subassembly upon the adjoining subassembly in the direction of shifting, and it is provided in such a manner that it can be pushed back in the direction of the force for latching the subassembly upon the mounting rail against the shifting direction.

The mounting rail latch means in this embodiment also avoids the edge of the mounting rail during the arrangement of the subassembly upon the mounting rail. Basically, the subassembly therefore can be arranged on the mounting rail also without any rotation or swinging in that it is shoved in the latch-on direction, preferably in a parallel arrangement with respect to the adjoining subassembly. Because the mounting rail latch means, likewise on the basis of the force against which it is shoved during arrangement upon the mounting rail, is shoved back against the shifting direction, the subassembly is also retained on the mounting rail likewise with the force of the power means.

In a preferred embodiment, the subassembly latch means and/or the mounting rail latch means are arranged on the foot part. When the foot part is shifted, the subassembly latch means and/or the mounting rail latch means is therefore shifted.

Here, the foot part can preferably be shifted against the force of the power means into the shifting direction and in the direction of the force against the shifting direction. In a further preferred manner, the foot part is arranged on the base body in a reversibly separable manner. In a furthermore preferred manner, it has a longitudinal extent with respect to which it is manufactured in a symmetrical mirror fashion.

In a likewise preferred manner, the subassembly is made in a symmetrical mirror fashion with respect to a midline so that the subassembly can be aligned against the adjoining subassembly also in an arrangement that is rotated by 180° with respect to the mounting rail.

Preferably, the subassembly can be latched upon the adjoining subassembly and the mounting rail by shifting the foot part against the shifting direction with relation to the base body. In a likewise preferred manner, it can be separated both from the adjoining subassembly and from the mounting rail by shifting the foot part in the shifting direction with relation to the base body.

In this embodiment, both the subassembly latch means and also the mounting rail latch means are arranged on the foot part so that by shifting the foot part, both the subassembly latch means and also the mounting rail latch means will be shifted.

In a particularly preferred manner, on the foot part, there is provided a slope that slides along the mounting rail during the arrangement of the subassembly upon the mounting rail. Here, the foot part and therefore simultaneously the mounting rail latch means will be shifted against the force in the shifting direction.

In a further preferred embodiment, there is provided on the foot part a handle, in particular, for actuation by means of a screwdriver for the separation of the subassembly from the adjoining subassembly and/or from the mounting rail so that the operator will find it very simple to separate the subassembly by means of the handle.

To facilitate the handling of the subassembly during the arrangement and latching on the mounting rail, there is provided an edge for the attachment of the subassembly upon the mounting rail, preferably bilaterally on the mounting rail, and preferably two mounting rail latch means are to be arranged on the subassembly, each of which cooperates with one of the edges of the mounting rail. The mounting rail latch means here are preferably provided in such a manner that the subassembly first of all is arranged parallel to the subassembly in a position swung with respect to the mounting rail plane with one of the mounting rail latch means upon an edge of the mounting rail in order subsequently to swing it into the latch-on direction so that the other mounting rail latch means will be arranged on the other edge of the mounting rail. In a likewise preferred manner, the subassembly can be arranged upon the mounting rail in that it is arranged parallel to the subassembly plane as well as parallel to the mounting rail plane and in that it is shifted in the latch-on direction. The mounting rail latch means therefore avoid the edges likewise initially and they are then, on the basis of the force of the power means, pushed back against the shifting direction, whereby the subassembly is latched upon the mounting rail.

In a likewise preferred manner, we provide two subassembly latch means that cooperate with two adjoining subassembly latch means in order, particularly in case of large-surface subassembly, to distribute the force that is to be applied for latching the subassembly upon the adjoining subassembly and/or to achieve a greater latching security.

To provide two mounting rail latch means and/or two subassembly latch means upon the subassembly, it is preferred to make the subassembly with two foot parts with in each case one mounting rail latch means and one subassembly latch means. In this embodiment, the subassembly can be taken out of the arrangement in that, first of all, one foot part and then the other foot part will be shoved into the open position. In a likewise preferred manner, the foot parts are so provided that both foot parts can be simultaneously separated from the mounting rail and/or the adjoining 11 subassembly. The problem is furthermore solved with a connection block with a mounting rail and at least one inventive subassembly that can be arranged upon the mounting rail.

BRIEF DESCRIPTION OF THE DRAWINGS

Other objects and advantages of the invention will become apparent from a study of the following specification, when viewed in the light of the accompanying drawing, in which:

FIG. 4b is a detailed perspective view of the encircled area of FIG. 4a;

FIG. 5b is a detailed perspective view of the encircled area of FIG. 5a;

DETAILED DESCRIPTION OF THE INVENTION

Figure 1:
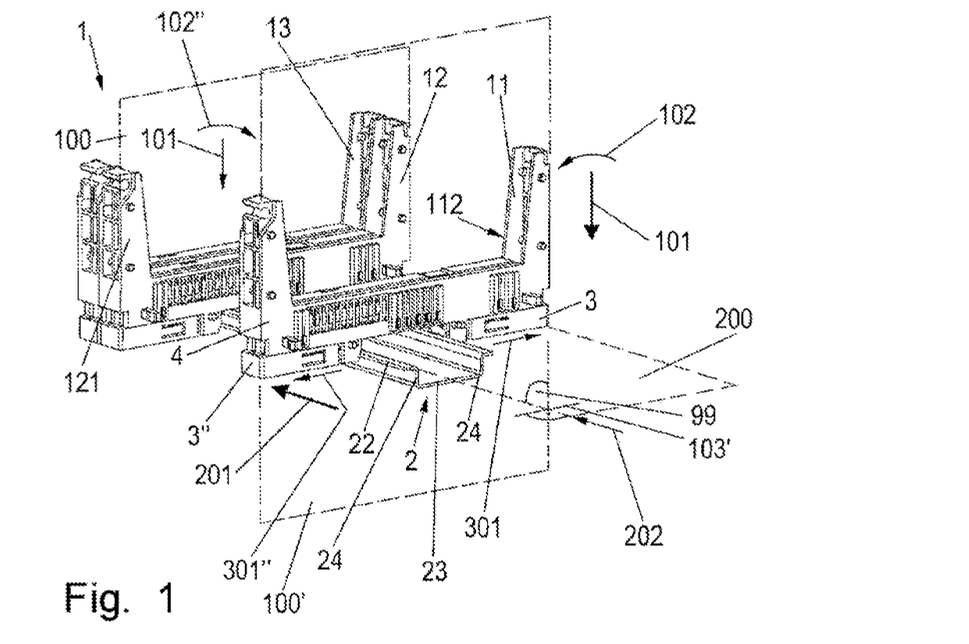
FIG. 1 is a front perspective view illustrating the mounting on a support rail of a plurality of base member electrical components.

Referring first more particularly to FIG. 1, a plurality of module base members 11, 12 and 13 are arranged for mounting on a conventional top-hat type support rail 2 having a horizontal base portion 23, a pair of upwardly extending vertical leg portions 24, and a pair of outwardly extending flange portions 22. Connection block 1 comprises two mutually adjoining subassemblies 12, 13, which together are mounted on the support rail 2, as well as a subassembly 11, which is not yet mounted on the support rail.

Mounting rail 2 extends along a longitudinal axis 202 and has a U-shaped cross-section, with the flange portions 24 defining a horizontal mounting rail plane 200.

The adjoining subassembly arranged on mounting rail 2, which adjoins the subassembly 11 that is to be arranged on mounting rail 2, extends parallel to a subassembly plane 100. FIG. 1 further shows a second subassembly plane 100' that is parallel to subassembly plane 100 in which extends the subassembly 11 that is not yet arranged on mounting rail 2. FIG.

1 shows that the mounting rail plane 200 as well as the subassembly plane 100 in the embodiment illustrated here are arranged at a right angle 99 with respect to each other. Besides, an intersection cutting the mounting rail plane 200, here shown on cutting line 103', runs with the second subassembly plane 100' at a right angle with respect to the longitudinal extent 202 of mounting rail 2.

Subassembly 11 can be arranged on mounting rail 2 by displacement in a downward latching direction 101 and/or swinging in a latching pivotal direction 102, both of which in each case extend parallel to the subassembly plane 100. Furthermore, subassembly 11 can be arranged upon the adjoining subassembly 12 by displacement in a longitudinal assembly direction 201 that extends parallel to the mounting rail plane 200. For arrangement upon the adjoining subassembly 12, subassembly 11 is first of all arranged in a vertical direction upon mounting rail 2, and is then pushed along the latter in the longitudinal direction 201.

In the illustrated embodiment, each of subassemblies 11, 12, 13 includes two foot members 3, 3" that cooperate with the edges 22 of mounting rail 2, respectively, for the purpose of latching the subassemblies 11, 12, 13 upon mounting rail 2. Subassemblies 11, 12, 13 furthermore in each case include a base member 4 upon which are arranged foot members 3, 3".

The two foot members 3, 3", arranged on subassemblies 11, 12 and 13, in each case can be shifted in a shifting direction 301, 301". Because the edges 22 of mounting rail 2 provided here are aligned in a manner directed away from each other, the shifting direction 301, 301" of the two foot parts 3 is provided in a manner directed away from each other. The directional changes that result by the alignment of the edges that mutually point away from each other are characterized in the illustration of FIG. 1 by the quotation marks on references 301, 301", 102, 102".

Figures 2A, 2B:
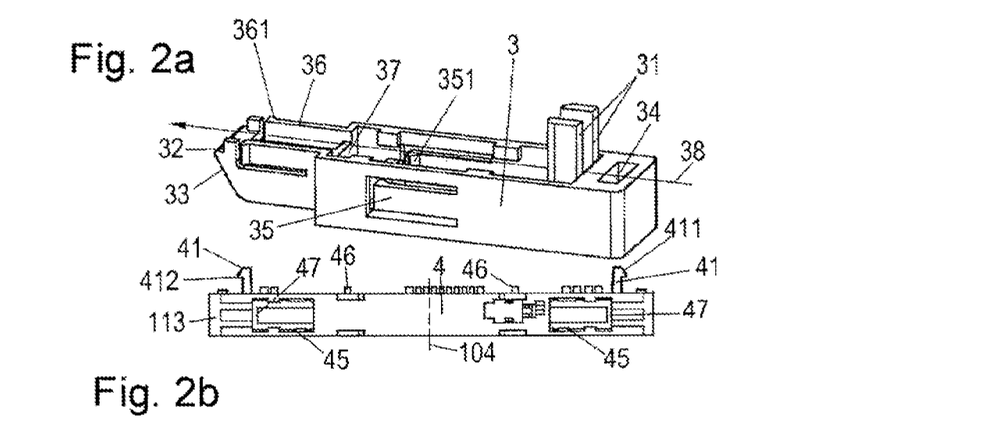
FIG. 2a is a perspective view of a foot member of FIG. 1.
FIG. 2b is a bottom view of an electrical component of FIG. 1.

Referring now to FIG. 2a, each foot member 3 is generally rectangular, being symmetrical relative to its longitudinal axis 38, and with a generally U-shaped cross-sectional configuration defining bottom and side walls. At one end, the foot member side walls include inclined surfaces 33 that terminate in projections 32 that are adapted to extend in locking engagement under the associated support rail flange portion 22, and a first pair of resilient horizontal latching arms 36 that are provided at their free ends with outwardly directed projections 361. At its other end, the foot member 3 is provided with an operating opening 34, and a second pair of upwardly extending rigid vertical latching arms 31. The side walls of the foot member are provided with a pair of integral resilient displacement arms 35 provided at their ends with inwardly directed projections 351. A transverse bridge wall 37 extends between the side walls of the foot member.

Referring to FIG. 2b, it will be seen that the bottom portion 113 of the base member 4 is provided symmetrically on each side of the center line 104 with a pair of ramps 45 arranged for engagement by the projections 351 on the shifting arms 35 of the foot members, respectively, a pair of laterally extending latch projections 41, and a pair of unlatching projections 46, the purposes of which will be described in greater detail below.

Figure 3A:
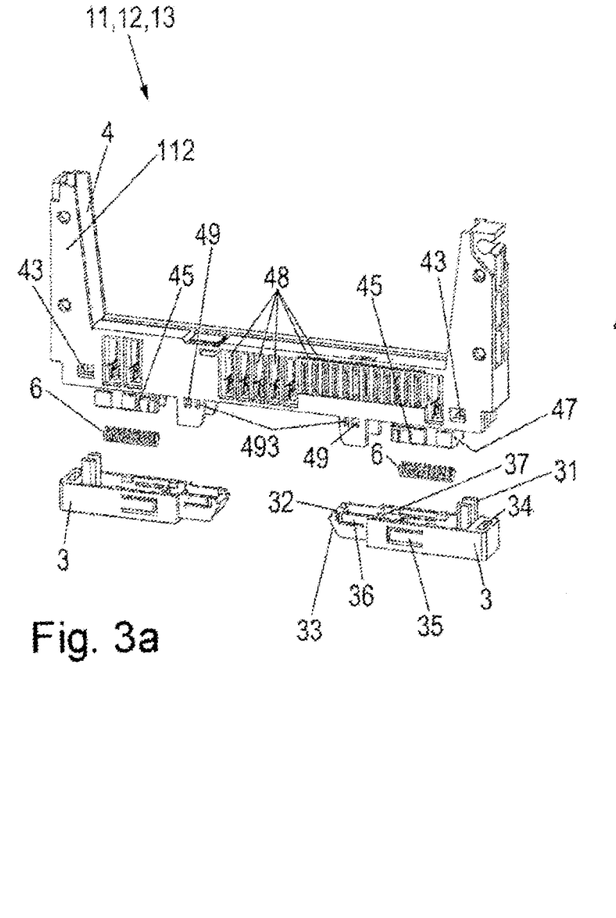
FIG. 3a is an exploded side perspective view of an electrical component of FIG. 1.
Figure 3B:
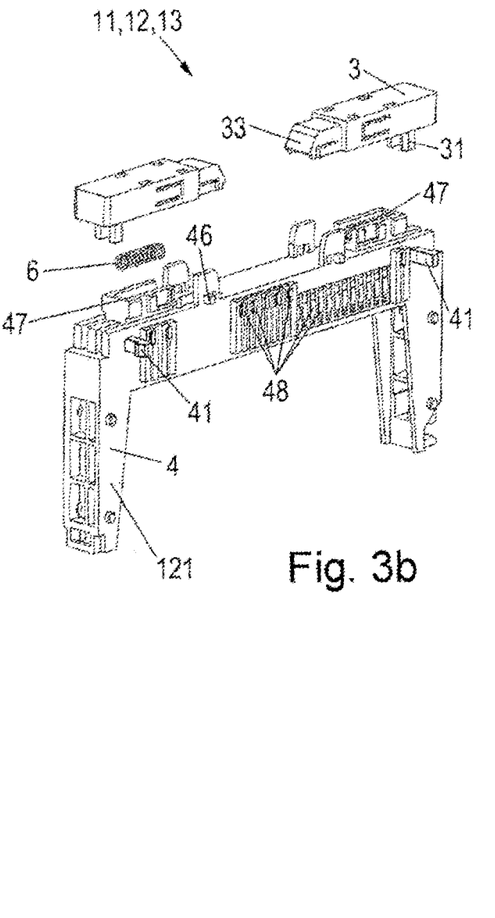
FIG. 3b is a corresponding bottom exploded perspective view.

As shown in FIGS. 3a and 3b, each base member 4 is generally U-shaped and includes a first side wall 112 provided at each end with first latch openings 43 adjacent the ramp surfaces 45, and a second side wall 121 is provided at each end with corresponding first latch projections 41. The intermediate portion of side wall 112 contains a pair of unlatching openings 49, and the intermediate portion of side wall 121 includes a pair of corresponding unlatching projections 46. The intermediate portion of side wall 112 also contains a third pair of openings 493.

The parts that are arranged symmetrically with respect to midline 104 on base body 4 as well as the parts that are arranged symmetrically with respect to the longitudinal extent 38 on foot member 3 make it possible to arrange subassembly 11 on mounting rail 2 also in a position rotated by 180° with respect to mounting rail 2.

When subassembly 11 is first latched upon mounting rail 2, slope surface 33 of foot member 3, during the shifting into the latch-on direction 101 and/or during swinging into the latch-on rotation direction 102, comes to rest upon edge 22 of mounting rail 2. During further shifting in the latch-on direction 101 and/or during swinging into the latch-on rotation direction 102, slope 33 slides along edge 22, whereby foot part 3 is shifted against the resilient force of a compression spring 6 (see FIG. 3) with relation to base body 4 into the shifting direction 301 until edge 22 engages the mounting rail projection 32. The mounting rail projection 32 is here provided in the form of an edge. Additional embodiments could be provided, for example, a mounting rail latch means 32 in the form of a recess.

The subassembly latch means includes a pair of integral latch arms 31 on the foot member 3 that extend upwardly at least partly into the base body 4, opposite the latch-on direction 101, for cooperation with the latch projection 41 of an adjacent base member, as will be described below.

The particular function of the other parts will be described on the basis of the following figures, more particularly, on the basis of FIGS. 6-9. Here, the function of the severally provided parts 31, 32, 35, 36, 37, 41, 43, 45, 46, 47, 49, 493 will in each case be illustrated and described relative to a foot member 3. But it also applies to the other severally provided parts, in each case in an analogous fashion.

FIGS. 3a and 3b show two perspective views of subassemblies 11, 12, 13 from FIG. 1, whereby foot member 3 and a biasing compression spring or power means 6 are shown in an exploded fashion. Visible in FIG. 3a is a side wall 112 of subassembly 11 in a position arranged in the arrangement show in FIG. 1 in mounting rail 2 resting against an adjoining side wall 121 of adjoining subassembly 12. In FIG. 3b, the position arranged in FIG. 1 on mounting rail 2 is on the adjoining side wall 121 of adjoining subassembly 12 resting against side wall 112 of subassembly 11.

In this arrangement, it can be seen that latching projections are provided on adjoining side wall 121, including the adjoining subassembly latch projection 41, the unlatching projection 46, and the electrical connections 48, which are made as female contacts.

Each of the subassemblies 11, 12, 13 in this embodiment is an electrical subassembly. Basically, the invention at hand can also be used for subassemblies that are not electrical subassemblies (not shown). In particular, as shown in FIG. 4a, it can be used for a subassembly into which one can arrange an electronic module 422 and/or an electrical connection bar 44.

FIG. 3 shows an embodiment in which the power means 6 is a compression spring arranged in a structural space of base body 4 (see FIG. 3b) between transverse wall 37 of foot part 3 and transverse wall 47 of base body 4.

Figure 4A:
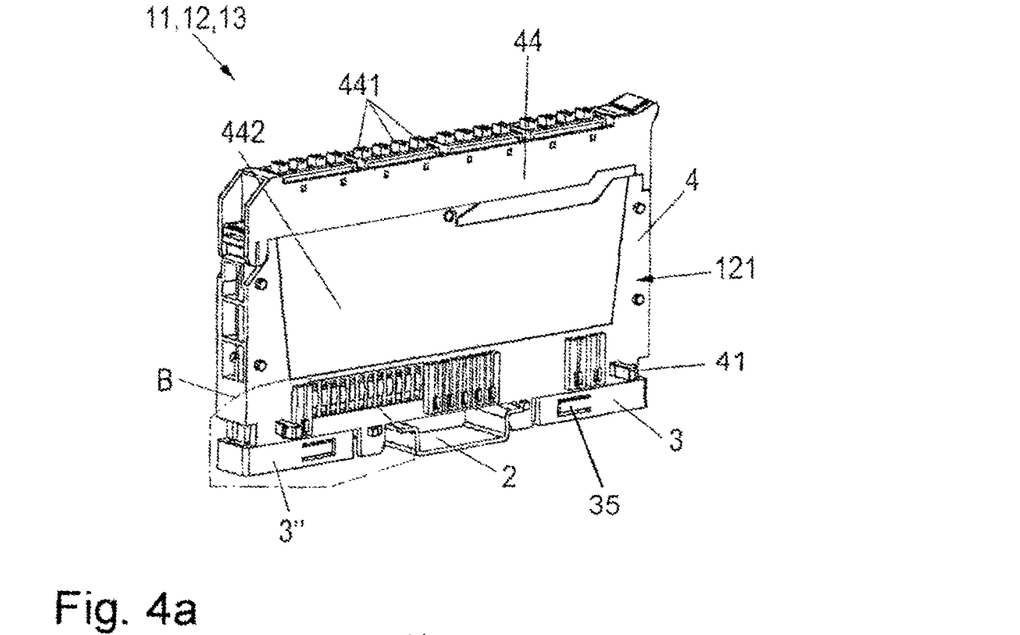
FIG. 4a is a right side perspective view of an assembled electrical module.

FIG. 4a shows a perspective view of the subassemblies 11, 12, 13 of FIG. 1, wherein subassembly 11 includes the electronic module 442 as well as the connection bar 44. In FIG. 1, one can see side wall 121 arranged to engage the side wall 112 of the adjacent subassembly.

The electronic element 442 can be pushed into the base member 4 of subassembly and can be electrically connected with the connection bar 44 that carries the electrical connections 441 for the wiring of subassembly 11. Subassembly 11 is latched upon mounting rail 2 by means of two foot parts 3, 3" that are arranged symmetrically with respect to its midline 104 (see FIG. 2).

Figure 4B:
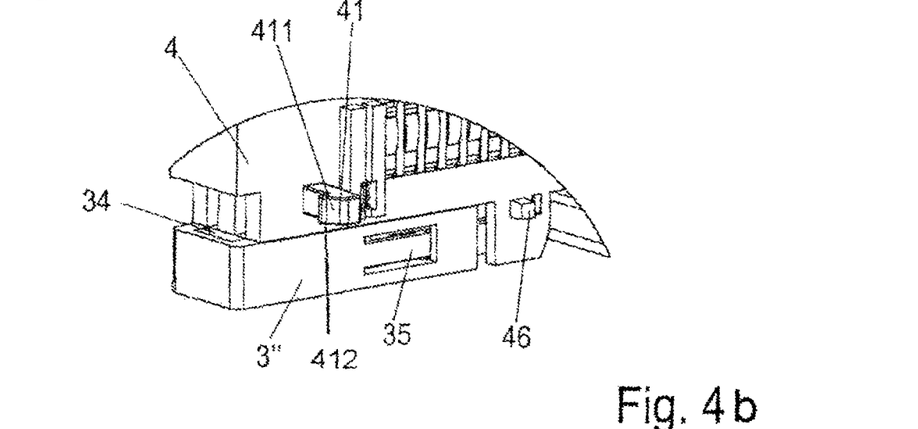

The detail view of FIG. 4b shows the adjoining subassembly latch means 41, the unlatching means 46, the subassembly lateral displacement means 35, as well as the operating opening 34.

Figure 5A:
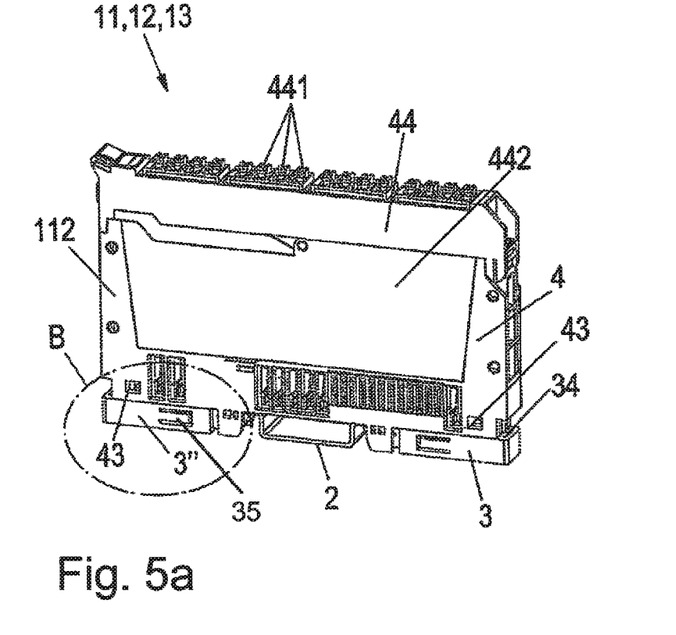
FIG. 5a is a left side perspective view of an assembled electrical module.
Figure 5B:
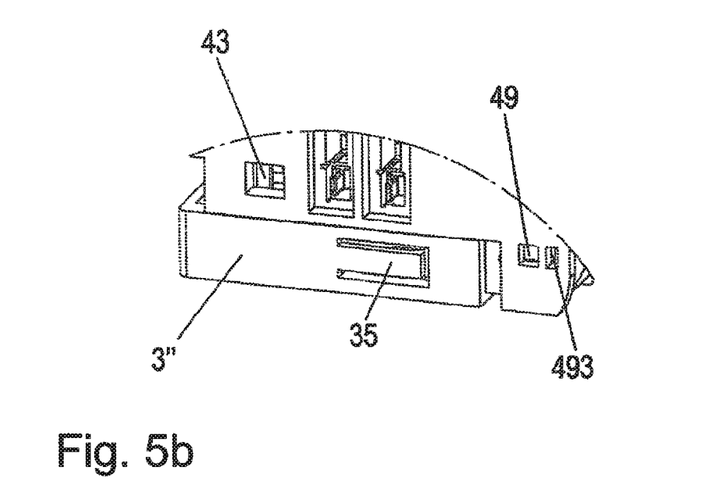

FIG. 5a shows one of the subassemblies 11, 12, 13 of FIG. 1 with connection part 44, and in the detailed view of FIG. 5b, one can see the side wall 112 that rests against adjoining side wall 121. This side wall contains a subassembly displacing arm 35, a first recess 43 arranged for cooperation with a projection 41 on the adjacent subassembly, a second recess 49 arranged for cooperation with an unlatching projection on the adjacent subassembly, as well as a third recess 493.

Figure 6:
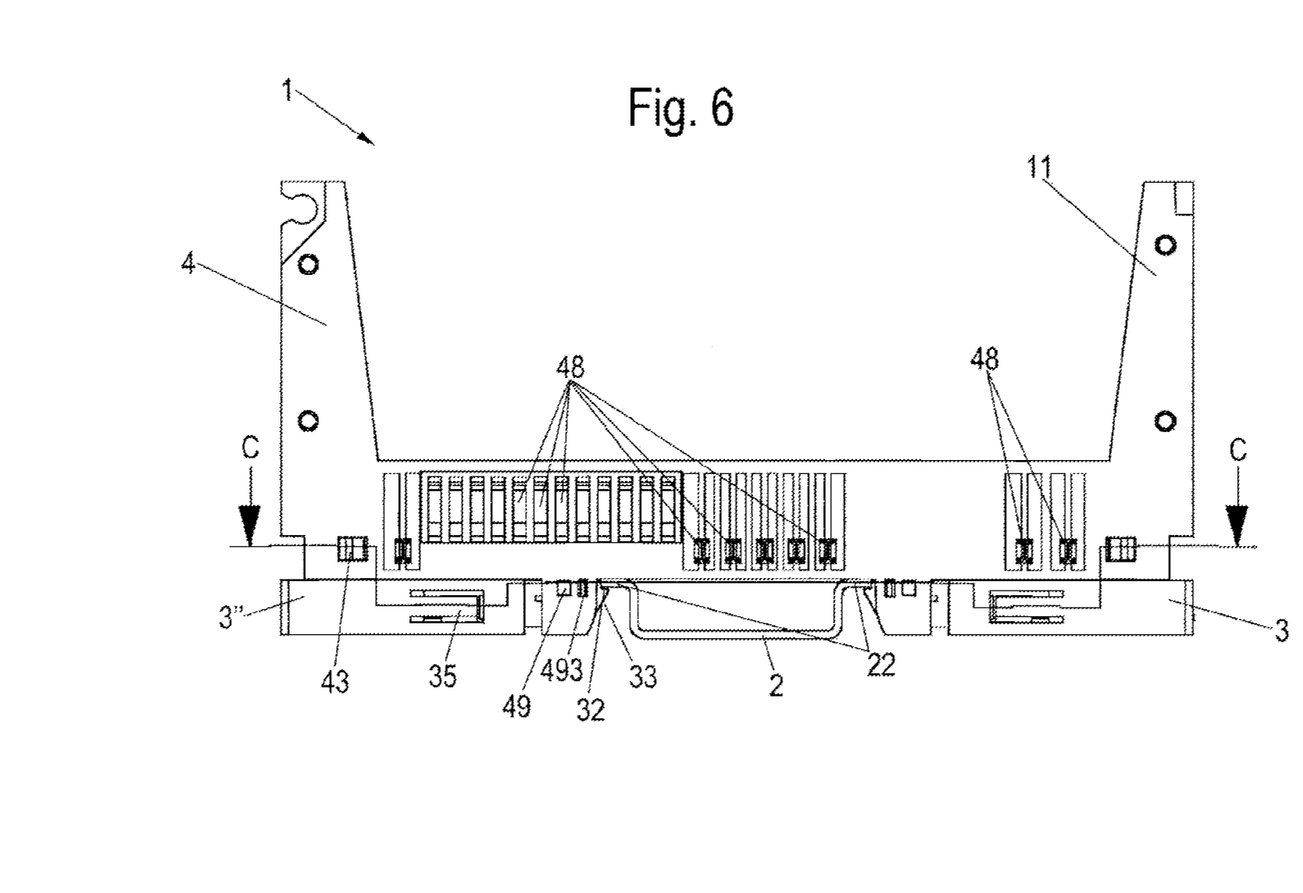
FIG. 6 is a side elevation view illustrating the base member of FIG. 1 mounted on a support rail.
Figure 7A:
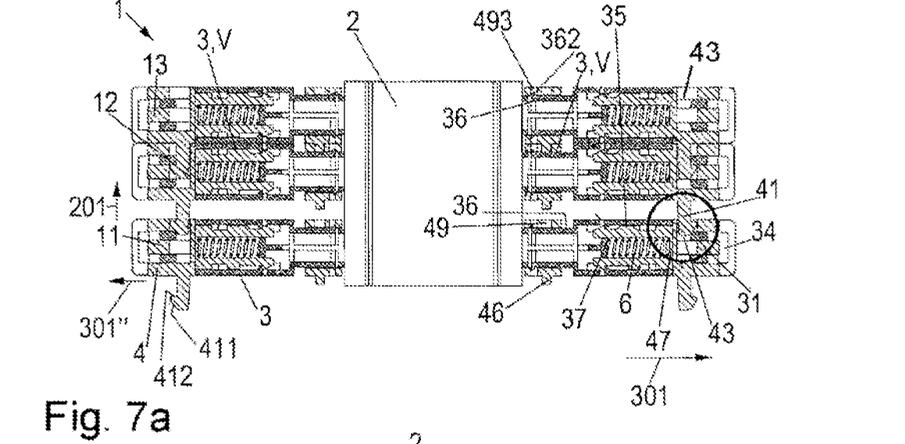
FIGS. 7a-7c are sectional views taken along line C-C of FIG. 6, illustrating the operation of the latching means which locks the base members together, and the foot members in the locked position.
Figure 7B:
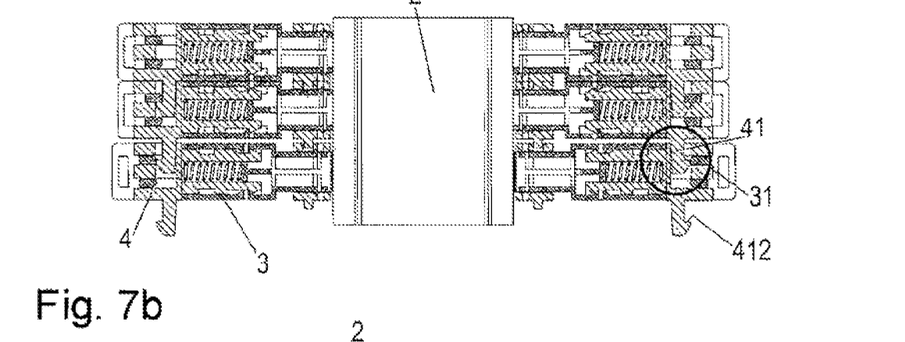

Referring now to FIGS. 6 and 7a, in order to connect a first subassembly 11 to a row of subassemblies 12 and 13 mounted on the support rail, the first subassembly 11 is initially displaced downwardly relative to the support rail (for example, in the direction 101 of FIG. 1), thereby to cause the foot projections 32 to extend under the edges of the support rail flanges 22. The first subassembly is then laterally displaced longitudinally of the support rail 2 toward the subassembly 12 as shown by the arrow 201, thereby causing the latching projections 41 on the subassembly 12 to extend into the latching openings 43 of the first subassembly 11. Owing to the cooperation between the inclined surfaces 411 on the latching projection 41 with the latching arms 31 on the foot members, the foot members of the first subassembly 11 are displaced outwardly relative to the base member, as shown in FIG. 7b. When the tips of the projections 412 clear the latch arm 31, the foot members are biased together by the associated springs 6 toward the locked position of FIG. 7c. The subassembly 11 is now locked to the support rail 2, and to the next subassembly 12. Preferably, side wall 112 of subassembly 11 then essentially rests on the adjoining side wall 121.

Figure 7C:
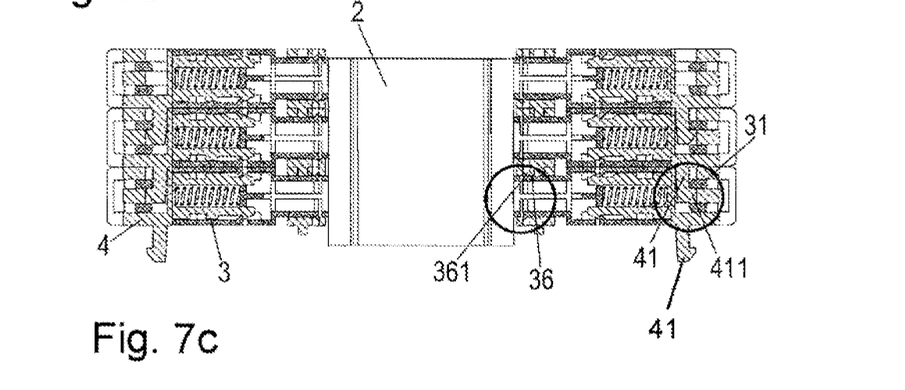

Latch means 36 has a hook-shaped end 361 with an oblique side 362 and is arranged in the third recess 493. During the latching action, the unlatching projection 46 extends into the unlatching opening 49.

Referring now to FIG. 8, in order to unlock subassembly 11 from the assembled components on the support rail, foot member 3, with the help of a screwdriver 5 (see FIG. 10), is displaced as far as possible in the shifting direction 301. The shifting arms 35 defined in the side walls of the foot member 3 of the first subassembly 11 are in the form of a hook with an oblique side 351, with its oblique side 351 comes to rest against a ramp 45 that is arranged on base body 4 of subassembly 11, and then slides along ramp 45, whereupon shifting means 35 is pushed in the assembling direction 201 until it rests against the adjoining subassembly 12, thereby pushing subassembly 11 slightly in the direction opposite from the assembling direction 201 (FIG. 8a).

Figure 8A:
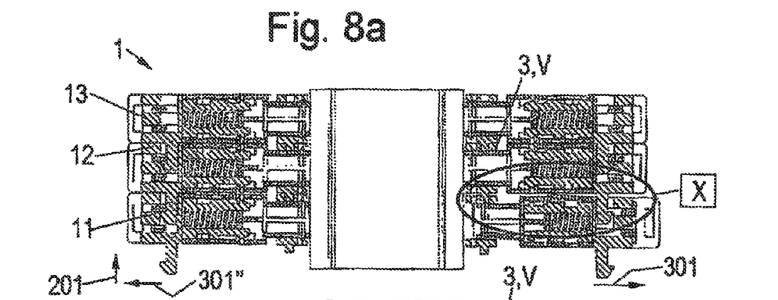
FIGS. 8a and 8b are sectional views taken along line C-C of FIG. 6, illustrating respectively the lateral displacement of a base member relative to another base member, and the latching of a base member in the unlocked condition.
Figure 8B:
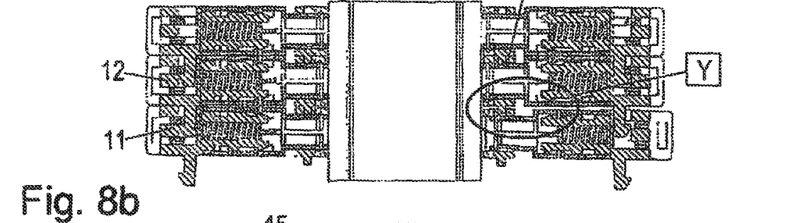
Figure 8C:
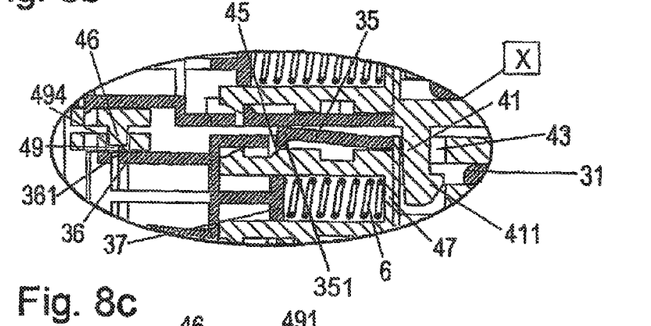
FIGS. 8c and 8d are detailed views of the encircled areas of FIGS. 8a and 8b, respectively.

Simultaneously, the subassembly latch means 31 is pushed into the shifting direction 301, 301" so that it no longer engages with catch corner 412 of adjoining subassembly latch projection 41. During the lateral shifting of subassembly 11 opposite to the assembling direction 201, the adjoining subassembly latch projection 41 in the process moves at least partly out of the first recess 43 (as shown in FIG. 8c).

During the outward displacement of the foot member relative to the base member, the inclined surface 362 of the latch projection 361 on the resilient latch arm 36 slides along transverse wall 494 (FIG. 8c) and enters the unlatching opening 49. Because subassembly 11, while shifting against the assembly direction 201 by means of a shifting means 35, is shifted with relation to the adjoining subassembly 12 and therefore is spaced apart from the latter, the unlatching means 46 extends only partially into the unlatching opening 49, so that projection 361 of latch arm 36 engages opening 49.

Figure 8D:
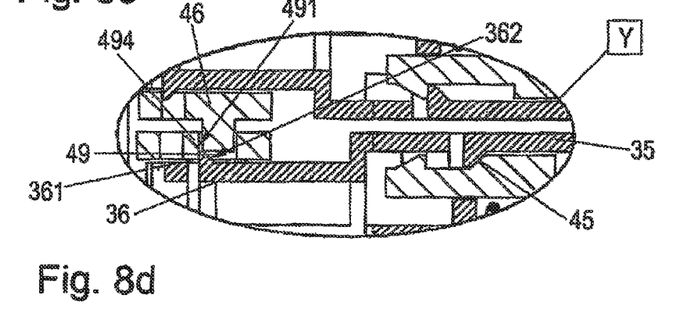
Figure 9A:
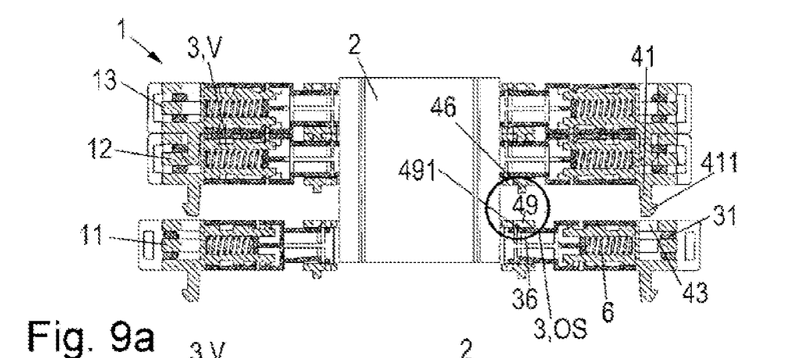
FIGS. 9a, 9b, 9d and 9e are sectional views taken along line C-C of FIG. 6, illustrating the unlatching operation of the latch means.
Figure 9B:
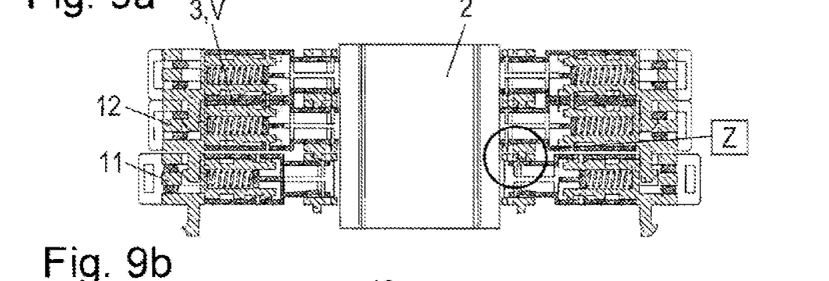
Figure 9C:
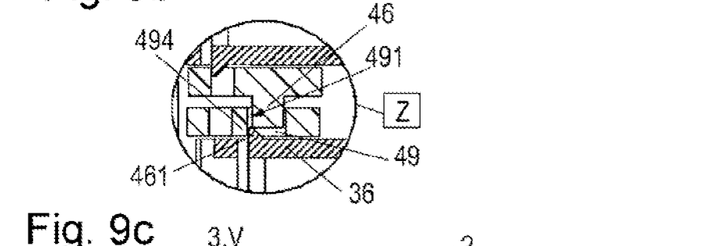
FIG. 9c is a detailed view of the encircled area Z of FIG. 9b.
Figure 9D:
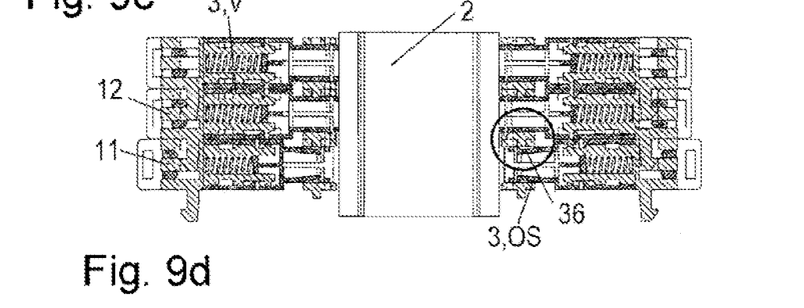
Figure 9E:
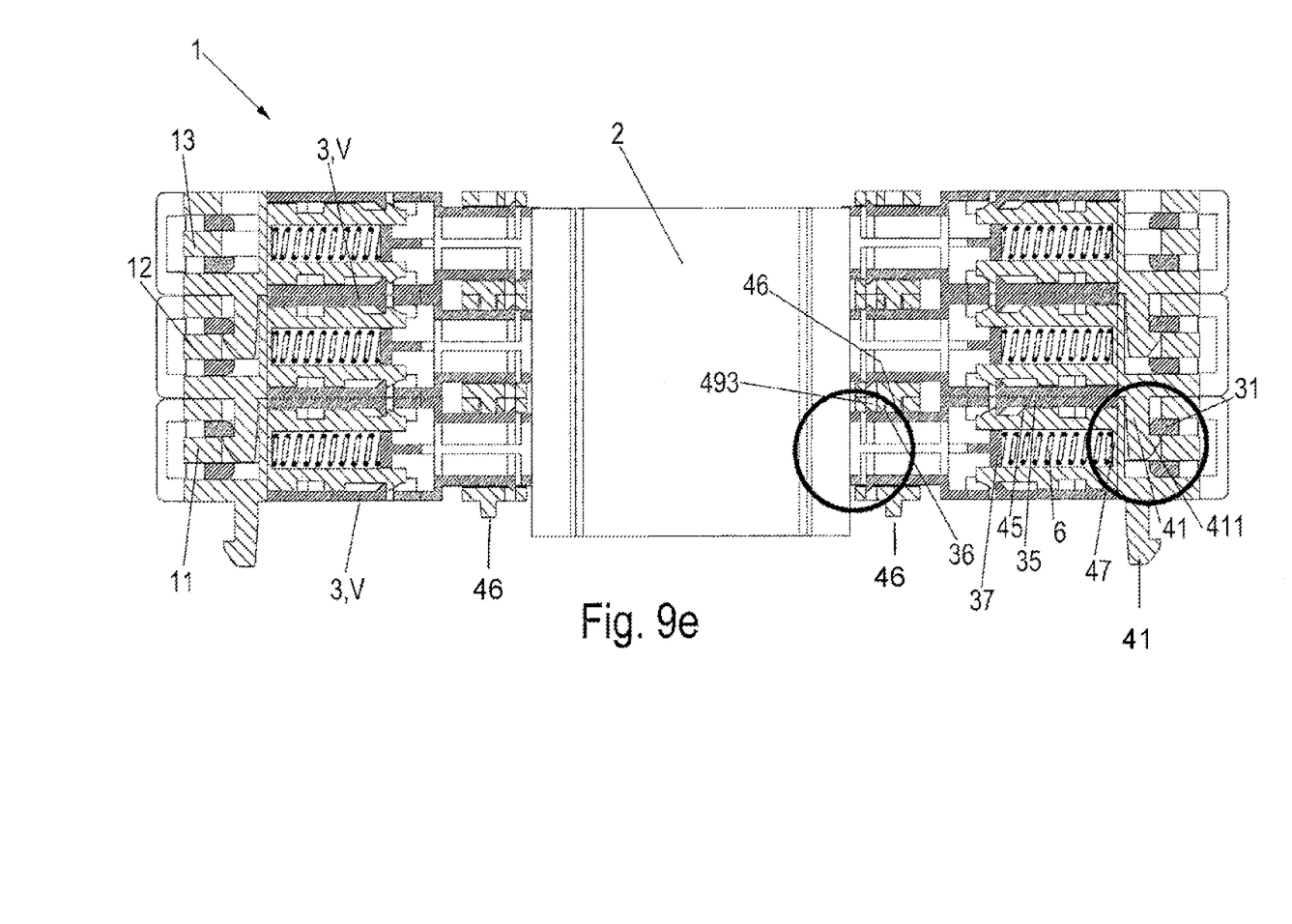

Upon release, foot member 3 is returned by the force of compression spring 6 inwardly in the direction opposite the shifting direction 301. In the process, shifting means 35 with its oblique side 351 slides back along ramp 45 (FIG. 8d). Furthermore, latching means 36 is shifted against shifting direction 301 until it rests on a surface 491 of wall 494 that faces toward unlatching opening 49, thereby locking foot member 3 in the open position OS.

FIG. 9 shows the line-up of a subassembly 11, which is in the open position OS, upon adjoining subassembly 12. When foot part 3 is in the open position OS, then during the shifting of subassembly 11 in the assembling direction 301, the unlatching projection 46 is pushed into the opening 49 and pushes the latch means 36 opposite the assembly direction 201 out of the opening 49. Then foot member 3 can again be displaced inwardly by spring 6 all the way toward the latched position V.

At the same time, the latch projection 41 of the adjoining subassembly 12 is again pushed into the first recess 43, whereby with its oblique side 411, it slides in an analogy to the description in FIG. 7 along the subassembly latch means 31 until the latter engages the latch corner 412 of the adjoining subassembly latch means 41 and rests against it. In this state, subassembly 11 is again latched upon mounting rail 2 as well as adjoining subassembly 12, and it is in the latched position V.

Subassembly 11 can be delivered both in the open position OS and in the latched locked position V.

Figure 10A:
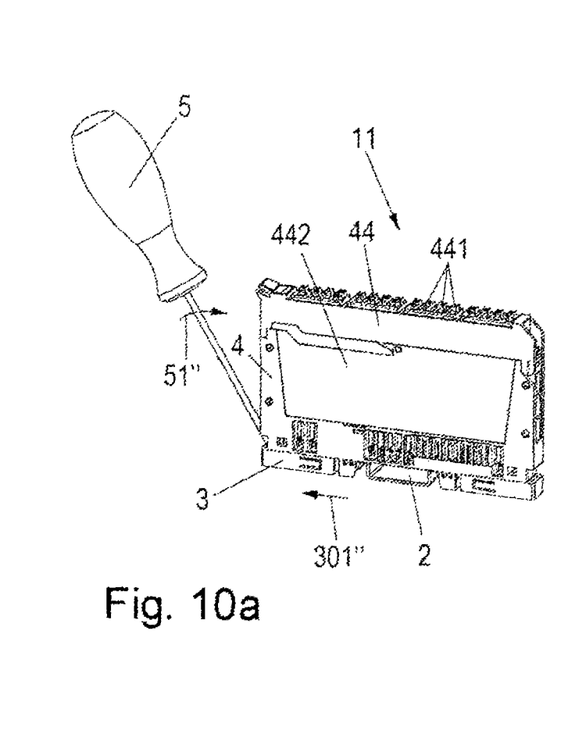
FIGS. 10a and 10b are perspective views illustrating the manner of displacement of the foot members relative to the base member.
Figure 10B:
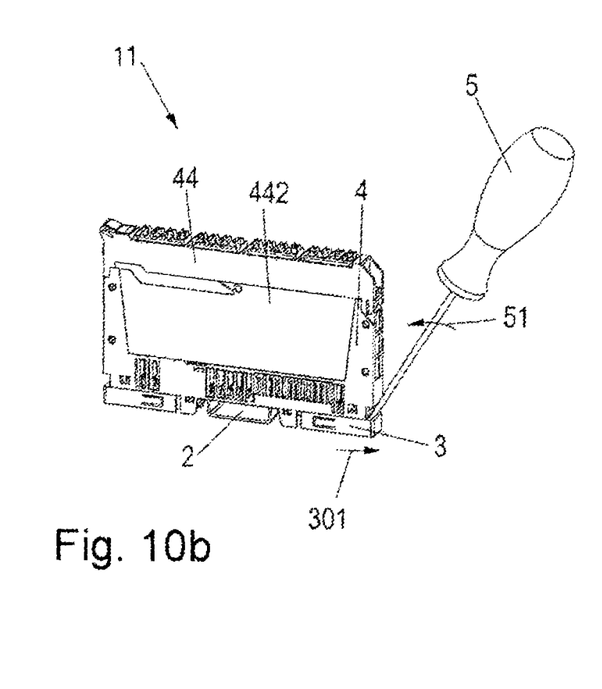

FIG. 10 demonstrates the separation of subassembly 11 with connection bar 44 and electronic element 442 from FIGS. 4 and 5 from mounting rail 2 by means of actuation means 5, which here is done by means of a screwdriver 5. The subassembly 11, shown here, has two foot members 3 that cooperate with two edges 22 of mounting rail 2 that point away from each other. As shown in FIG. 1, this again causes directional changes that are characterized by the quotation marks on references 301, 301", 51, 51".

Screwdriver 5 is inserted into operating opening 34 of foot member 3, which here is made as a fourth recess and is pivoted in the separation direction 51. Here, it rests against base body 4 of subassembly 11 and pushes foot member 3 into shifting direction 301 according to the mechanism explained in FIGS. 7-9. Here, foot member 3 is slightly shifted against assembly direction 201 (see FIG. 1) on the basis of shifting arm 35. During its return against shifting direction 201, foot member 3 is latched in the open position OS, see FIG. 9(a). The adjoining subassembly latch means 41, which cooperates with the subassembly latch means 31 of the foot part 3 that is latched in the open position OS, is therefore separated from subassembly 11 and can be taken out of the first recess 43. Besides, foot member 3 is no longer latched upon edge 22 of mounting rail 2.

This process is then repeated for the other foot member 3 of subassembly 11, so that the adjoining subassembly latch means 41 (see FIGS. 7-9) of the other foot part 3 is also separated. Subsequently, subassembly 11 can be taken off mounting rail 2 in that it is shifted against the assembly direction 201, and in that it is subsequently shifted against the assembling direction 101 and/or that it is pivoted against the assembling rotation direction 102.

In the separation of subassembly 11 explained here, the foot members 3 of subassembly 11 are separated one after the other; therefore, subassembly 11 is first of all slightly adjusted by means of shifting means 35 of the first separated foot member 3 with respect to the subassembly level 100 of the adjoining subassembly 12. The adjustment, however, first of all, is very slight. Besides, a simultaneous separation of the two foot members 3 is also possible here, and that brings about a parallel shifting of subassembly 11 with respect to adjoining subassembly 12. Furthermore, the foot members 3 can also be so coupled together with each other that by means of the separation of a foot member 3, simultaneously the other foot member 3 is also separated, so that subassembly 11, during separation, is likewise pushed parallel to the adjoining subassembly 12. Finally, one can also make an inventive arrangement with only one foot part 3, which, during the separation, facilitates a parallel shifting of subassembly 11 with respect to adjoining subassembly 12. In these embodiments, subassembly 11 can be arranged not only by pure parallel shifting with respect to the adjoining subassembly 12 upon the latter, but can also be separated from the adjoining subassembly 12 by means of a parallel shifting action.

While in accordance with the provisions of the Patent Statutes the preferred forms and embodiments of the invention have been illustrated and described, it will be apparent to those skilled in the art that changes may be made without deviating from the invention described above.

What is claimed is:

1. A module latching arrangement for mounting and dismounting a plurality of parallel electrical modules in a row relative to a support rail, comprising:
    a generally U-shaped support rail (2) having a horizontal base portion (23), a pair of vertical parallel leg portions (24) extending upwardly from the opposed side edges of said base portion, and a pair of horizontal flange portions (22) extending outwardly from the upper edges of said leg portions;
    at least two base members (4) arranged in side-by-side relation orthogonally above and extending transversely across said support rail, each of said base members having a horizontal bottom edge portion seated intermediate its ends on said support rail;
    at least one foot member (3) connected with the bottom edge end portion of a first one of said base members for horizontal longitudinal sliding movement transversely of said rail between locked and unlocked positions relative to the adjacent support rail flange portion; and
    a lateral displacement arrangement including:
        a resilient shifting arm (35) longitudinally arranged on a side wall of said one foot member that is adjacent to said second base member, said shifting arm having a projection (351) on an inner side of said side wall; and
        a ramp surface (45) on an outer side of said first base member, wherein said ramp surface is engaged by said shifting arm projection when said foot member is displaced from said locked position toward said unlocked position, said ramp surface being inclined so as to effect outward displacement of said resilient shifting arm into said adjacent second base member, to thereby separate said first base member from said second base member.

2. A module latching arrangement as defined in claim 1 and further including:
    first latching means (36; 49) for latching said foot member in said unlocked position.

3. A module latching arrangement as defined in claim 2, wherein said first latching means includes:
    a resilient first latching arm (36) extending longitudinally of one side wall of said foot member, said first latching arm having a lateral first latch projection (361);
    said first base member having a side wall (112) containing a first opening (49) for receiving said first latch projection when said foot member is in said locked position.

4. A module arrangement as defined in claim 3, and further including:
    unlatching means arranged on said second base member for unlatching said first latching means when said first base member is mounted on said support rail adjacent said second base member.

5. A module arrangement as defined in claim 4, wherein said unlatching means comprises an unlatching projection (46) on said second base member arranged for insertion into said for first opening when said first and second base members are mounted in contiguous engagement on said support rail, to thereby displace said first latch projection from said first latch opening.

6. A module latching arrangement as defined in claim 2, and further including:
    second latching means for latching said foot member in said locked position when said first and second base members are mounted on said support rail adjacent each other.

7. A module latching arrangement as defined in claim 6, wherein said second latching means is also operable to lock together said first and second base members when said foot member is in said locked position.

8. A module latching arrangement as defined in claim 7, wherein each of said base members includes a pair of parallel spaced side walls (112, 121); and further wherein said second latching means comprises:
    a vertical rigid second latching arm (31) extending upwardly from said foot member between said base member side walls; and
    a locking hook (41) extending horizontally from a side wall of said second base member toward said first base member, said locking hook having an end portion adapted to extend through a second latch opening (43) contained in the side wall of said first base member, said hook end portion carrying a projection (411) arranged for latching engagement with said second latching arm, thereby to lock said first base member to said second base member.

9. A module latching arrangement as defined in claim 1, and further including spring means (6) for biasing said foot member toward the locked position.

10. A module latching arrangement as defined in claim 9, wherein said foot member has a projecting first end portion (32) that extends beneath the associated support rail flange portion when said foot member is in said locked position.

11. A module latching arrangement as defined in claim 10, wherein said foot member first end portion includes an inclined surface (33) adapted to engage the associated support rail flange portion.

12. A module latching arrangement as defined in claim 11, wherein said foot member has a second end portion that contains an operating opening (34) for receiving the tip of a foot displacing tool (5).

13. A module latching arrangement as defined in claim 1, wherein said base bodies are arranged in parallel vertical planes that extend normal to the horizontal plane containing said support rail horizontal base portion.

14. A module latching arrangement as defined in claim 13, wherein each of said base members is generally U-shaped and includes a horizontal base portion and a pair of vertical arm portions; and further including an electrical module (442)

mounted in the space defined between said base member base and vertical arm portions, and a contact bar (44) extending across said electric module and connected between upper ends of said base member vertical arm portions.

\* \* \* \* \*